United States Patent Office 3,365,297
Patented Jan. 23, 1968

3,365,297
METHOD OF MAKING ANIMAL FOOD
Hovey M. Burgess, Greenwich, Conn., Philip J. Wruk, Battle Creek, Mich., and Raymond E. Mohlie, Scituate, Mass., assignors to General Foods Corporation, White Plains, N.Y., a corporation of Delaware
No Drawing. Continuation-in-part of application Ser. No. 843,343, Sept. 30, 1959. This application Jan. 3, 1963, Ser. No. 249,121
2 Claims. (Cl. 99—2)

This application is a continuation in part of co-pending application Ser. No. 843,343, filed Sept. 30, 1959, now abandoned.

This invention relates to a novel food for animals and to a method of making the same. More specifically, it relates to a novel dog food particularly characterized by its ready hydratability and its retention of particle identity during and after hydration.

As is well known to those skilled in the art, animal foods and particularly dog foods are commonly prepared for the consumer in two forms: the meal type particularly characterized by its dry cereal-like texture and by its low moisture content, typically about 10%; and the canned type particularly characterized by its meat-like texture and by its high moisture content, typically as high as 75%.

Although the canned type of dog food generally has a very high degree of palatability or receptivity by dogs, it is characterized by poor storage characteristics and comparatively low nutritional value. On the other hand, the meal type animal food, while eminently superior with respect to these characteristics, is commonly found to possess low palatability. In many cases, the animal will not eat it in dry form and it becomes necessary to add liquids thereto.

Although prior art meal type foods may be readily enough moistened, they commonly become mushy or doughy and stick to the plate. A food which possesses these characteristics is not palatable to most animals and they may not consume enough of such food to provide the proper nutritional intake. Thus, because of the undesirable physical properties of such foods, their superior nutritional features are not made available to the animal.

It is an object of this invention to prepare a novel type animal food characterized by a very high degree of palatability, a high nutritional content, ready hydratability, and retention of particulate character on hydration.

This invention relates to a method of preparing a hydratable animal food characterized by the above properties, said method comprising conditioning a mixture of farinaceous grain and proteinaceous meal in a ratio of 10:1 to 1:1 to 25%–30% moisture; heating said mixture at a product temperature of 190°–325° F. for 3–40 minutes to cause incipient pyrolysis throughout said mixture, said incipient pyrolysis being characterized by substantial dextrinization and caramelization of the starch in said farinaceous grain, a Maillard Reaction between the carbohydrate in said grain and the protein in said protein meal, and some decomposition of organic substances in the mixture; and terminating said incipient pyrolysis before complete pyrolysis occurs by quenching the product to below the pyrolysis temperature.

In accordance with a more specific aspect of this invention, the hydratable product may be prepared by conditioning a charge mixture comprising a farinaceous grain such as corn and proteinaceous meal to 25% to 30% moisture, forming the mixture into particles, and heat treating the particles at less than 325° F. Preferably the heat treating may be effected in two stages: in the first stage, the moisture content may be rapidly lowered to 3–10% moisture, say 3–5%, while keeping the product temperature at below 190° F. In the second or holding stage, wherein incipient pyrolysis occurs, the particles may be heat treated for a longer period of time at product temperature of 190°–290° F. to give a final product having a moisture content which may be substantially anhydrous. The product is quenched during incipient pyrolysis to below 125° F. to terminate the pyrolysis and prevent the product from becoming completely decomposed.

The farinaceous charge materials which may be employed include wheat, barley, oats, etc. and their derivatives, including, e.g., wheat middlings or wheat germ. The preferred farinaceous grain charge material may be corn, preferably in the dry state, and including whole corn, corn meal, corn germ meal, corn bran, etc. Although the entire content of the mixture may be derived solely from whole corn or corn meal, it is preferred to use a mixture of corn meal, corn bran, and corn germ meal.

The proteinaceous meal which may be a component of the product of this invention will preferably be soy bean meal, meat meal, or fish meal, and in the preferred embodiment it may be a mixture of soy bean meal and meat meal, preferably in about equal proportions.

In the preferred embodiment, the ratio of farinaceous charge, e.g., corn to proteinaceous meal may vary from 3:1 to 1:1, commonly 1.5:1. In one embodiment the ratio was desirably maintained at about 45:32. The farinaceous charge and proteinaceous meal together may comprise from 50% to 95%, say 90% of the total mixture.

Other preferred ingredients in the product include: desired flavors in the form of, e.g., fish meal (when fish is not used as the proteinaceous meal), salt, fat, etc., typically present in amount of 0.25% to 6%, say 5.5% of the total weight; fibrous components typified by beet pulp, preferably present in amount of 0.25% to 2%, say 1%; and desired vitamins, minerals, etc., sufficient to complete the nutritive balance of the product.

A typical specific embodiment of the product may be prepared from the following ingredients:

| | Percent |
|---|---|
| Farinaceous charge (in the form of an equi-part mixture of corn germ meal, corn bran, corn meal, and wheat middlings) | 58 |
| Proteinaceous meal (in the form of an equi-part mixture of soy bean meal and meat meal) | 32 |
| Wheat germ | 3 |
| Fish meal | 3 |
| Alfalfa | 0.5 |
| Beet pulp | 1 |
| Salt | 0.5 |
| Fat | 2 |
| Vitamins, minerals, etc., q.s. | |

In accordance with this invention the mixture of charge materials may be conditioned to a moisture content from its initial content of 8% to 12%, say 10% to a higher level, typically 25%–30%, say 27%–30%. This may be affected by addition of appropriate amounts of cold water, warm water, hot water, or steam to the mixture. When cold water is employed it will be desirable to raise the moisture content to fall within the lower portion of the range, i.e., to 25%–27%.

In one embodiment of the invention, conditioning may be effected by addition of cold water to the mixture in a closed paddle mixer (e.g., of the Beale tube type). Preferably the amount of cold water added will be sufficient to raise the moisture content to 25%–30%. In this embodiment, there may be little or no gelatinization of the starches which may be present in the mixture.

In accordance with other aspects of this invention, the product of this invention may be obtained from the hereinbefore described mixture of raw materials by subjecting an intimate mixture of those raw materials to conditions of time, temperature, pressure, and moisture which effects a less than full-gelatinization of the starch components of the mixture. Such a treatment may include a near-gelatinization.

Near-gelatinization of the starch, as the term is herein employed, means that as a result of the conditions of treatment, the starch granules may have been swollen and distended at least to the point at which, when the starch granules are viewed through a microscope having a polarizing filter, the maltese-cross configuration within the cell or granule contents (presence of which characterizes unfully gelatinized starch granules) will have substantially disappeared. Near-gelatinization also further means that the starch cells or granules may be in fully-expanded, swollen state just short of rupture—and that very few of the granules will have been ruptured. However, this near-gelatinized state should not be confused with the aforementioned incipient pyrolyzed state. Incipient pyrolysis is a necessary feature of this invention whereas near-gelatinization prior to incipient pyrolysis is only a preferred embodiment.

Near-gelatinization may be effected by raising the moisture content of the raw material mix (which may be 8% to 12%, say 10%) to about 25%–30%, preferably 27%–30%. This may be done before or during near-gelatinization and it may be done by use of either steam, warm water, or hot water. This near-gelatinization includes the steps of heating in the presence of the noted amounts of moisture.

Conditioning to desired moisture content may be accomplished in various types of apparatus. For example, it is possible to employ a closed paddle mixer (Beale tube type) in which the material may be cooked preferably by contact with both indirect and direct steam. The direct steam may provide at least a portion of the moisture required to raise the moisture content to the desired level, the remainder of the moisture being provided by water which may be admitted during or before cooking.

In an alternative embodiment which may be employed when it is desired to produce a product having a lower bulk density and a higher rate of soaking, the mixture may be passed through a screw-type mixer immediately followed by a screw-type extruder to which steam may be admitted. Typical of an apparatus in which this alternative process may be practiced is a Wenger-type extruder which includes a tandemly mounted screw mixer and screw extruder.

The so-conditioned mixture, when treated by either of these alternative processes, will preferably be formed into small pelletes or cylinders, preferably by extrusion. In the preferred embodiment, the compacts or extrudate may be in the form of cylinders or pellets having a diameter of about three-sixteenths inch and a length about the same. These cylinders may contain about 25%–30% moisture.

Further treating of the formed product, whether subjected to near-gelatinization or not, includes heat treating the mixture to the incipient pyrolysis stage. Although it is not possible to accurately and fully determine the chemical and other reactions which occur during the controlled heat treating step, this operation includes at least some dextrinization or caramelization of the starch components in the farinaceous grain, and some toasting or near pyrolysis of particularly the carbohydrate components of the mixture evidenced by the appearance of a brown color (Maillard Reaction) between the carbohydrate in said farinaceous grain and the protein in said protein meal, and some decomposition of the organic substances in the mixture. These reactions are distinguished from the surface pyrolysis of prior art procedures in that the pyrolysis extends throughout inner portions of the final product. In the product of this invention a dark, brown color permeates the entire mixture as a result of the incipient pyrolysis which occurs throughout the mixture. When the brown color emerges throughout the mixture of animal food, it is then merely necessary to cool or quence the product to below 125° F. in order to terminate the pyrolysis before it has proceeded to completion.

The heat treating which causes pyrolysis will commonly be conducted simultaneously with drying and, accordingly, it may alternatively be referred to as such. Preferably drying will be effected to lower the moisture content of the pellet product to about 1% moisture, i.e., to substantially anhydrous condition.

Heat treating and drying may preferably be effected by subjecting the product to a pyrolysis including temperature (i.e., internal product temperature) of 190°–325° F., say 240° F. for 20–30 minutes. Commonly the heat treating may be accomplished by blowing hot air through the mass of pellets for, e.g., about 30 minutes—the air being at an inlet temperature of 600°–800° F. and outlet temperature of 250°–270° F., the outlet temperature providing the desired product temperature.

In the preferred embodiment, the heat treating or drying will be effected in a two-step operation. In the first stage, drying may be conducted rapidly down to partial dryness of less than 7%–10%, but not less than about 3%–5%. The air inlet temperature may be 600°–800° F. while the air outlet temperature may be 240°–260° F. to accomplish the partial drying stage. This stage is not critical and various heating means may be used to bring the moisture level to 3–10%. The product temperature during this stage will usually be below 190° F. In the second or slow stage of the two-stage heat treating operation, which may be referred to as a holding stage, the moisture content of the product pellets may be lowered from 3–10% moisture down to a substantially anhydrous state typically to not more than about 1%, and commonly to about 0.5%. In the holding stage the air inlet temperature is usually less than 325° F. and preferably 240°–320° F., with an air outlet (and product) temperature about 30°–40° F. lower than the inlet temperature—say 190°–290° F.

The pellets are maintained in the holding stage for about 30 minutes during which time: (a) the moisture content of the mixture is lowered as indicated, and (b) incipient pyrolysis occurs. Incipient pyrolysis includes various reactions within the pellets, i.e.: (a) a controlled pyrolytic degradation of carbohydrate components; (b) a high degree of dextrinization of the starch; (c) caramelization of starch; (d) and a Maillard type reaction. These reactions are characterized by the fact that they occur throughout the animal food mixture instead of merely at the surface of the mixture.

The pellets which have been so-treated are then quenched or cooled to a temperature of below 125° F., e.g., by a blast of cold air to terminate the incipient pyrolysis stage and prevent the product from completely being decomposed. The cooled pellets which at this point may have a moisture content of less than 1% may then be moistened to about their equilibrium moisture content of 7%–9%.

In an alternative embodiment, the extruded pellets which have been subjected to partial drying in a first stage to a moisture content of preferably less than 3%–10% may be subjected to incipient pyrolysis by heating for 20–30 seconds to 1–2 minutes, preferably 30–90 seconds with direct steam at 30–90 p.s.i.g., preferably 45–60 p.s.i.g.

The product will preferably be classified or screened to separate out minor portions of undesired fines (which may be recycled) to then give a substantially uniformly sized particle, each having a diameter preferably about three-sixteenths inch and a length ranging from about one to about four-sixteenths inch. It will be apparent that these dimensions may be varied.

The product is characterized by its high water adsorptivity, and particularly by its high degree of particle integrity during and after adsorption. It will be found that after the product of this invention has absorbed water, the individual cylinders, pellets, or granules still are discrete and can readily be separated from the mass. In contrast, prior art meals commonly form a mush on addition of water and are characterized by little or no retention of any discrete particle on rehydration. The product has a high tolerance to a wide range and temperature of added liquid.

It has been found that animals, and particularly dogs, find discrete particles more palatable than a mush. More specifically, animals show a higher preference for the wetted product of this invention than for the wetted prior art meals. In fact, the palatability of the wetted prior art meal is so low that many animals prefer to pass a feeding rather than to eat the mush.

It may also be noted that the product of this invention also adsorbs water at a faster rate than does a standard prior art meal; and that the novel product possesses a greater degree of particle integrity under general handling conditions.

This invention will now be more fully described by reference to the following example.

Ingredients:                         Percent by weight
    Corn germ meal _____ 15
    Corn bran _____ 15
    Corn meal _____ 15
    Soy bean meal _____ 16
    Meat meal _____ 16
    Wheat middlings _____ 13
    Wheat germ _____ 3
    Fish meal _____ 3
    Alfalfa _____ 0.5
    Beet pulp _____ 1.0
    Salt _____ 0.5
    Fat _____ 2.0
    Vitamins and minerals, q.s.

In this specific example, 100 parts by weight of the charge mixture were wetted with 10 parts of water and the mixture placed in a Beale tube (a closed paddle mixer to which steam and hot water are added to the mass as cooking and agitating occur). Cooking was continued for 3 minutes during which time the moisture content of the mixture rose to about 27%. This mass of material was then passed to an Enterprise extruder (a screw-type extruder) from which it was extruded as a small cylinder of about three-sixteenths inch diameter. These cylinders were then cut to provide a length or height of about three-sixteenths inch.

The uniformly sized cylinders were then placed in a vessel having a false bottom through which hot air was passed. The cylinders were contacted with hot air at inlet temperature of about 300° F. for 30 minutes. Under these conditions, the product temperature was kept at below 190° F. and the moisture content of the cylinders was lowered to not less than about 3%–5% moisture.

In the second or holding stage of drying, the moisture content was lowered to about 1% by use of inlet air temperature at 300° F. and outlet air temperature at about 270° F. After a period of 30 minutes the product was uniformly and darkly brown in color. Several cylinders were broken into small pieces and found to be uniformly browned throughout the inner portion of the mixture as well as the surface.

The product (while still undergoing pyrolysis) was quenched to below 125° F. by a cold air blast having a temperature of 40°–50° F. The product was then screened on an 8 mesh U.S. Standard Sieve Screen to remove fines, and then moistened to 8%–10% moisture by addition of 10 parts of water per 100 parts of product.

The so-treated product was characterized by its particulate integrity on wetting. Addition of water to the product gave a moist readily palatable food in which the individual cylinders retained their discreteness.

While the present invention has been described with reference to a particular example, it is not to be limited thereby, but reference is to be had to the appended claims for a definition of its scope.

What is claimed is:

1. The method of preparing a hydratable dog meal which comprises conditioning a mixture comprising a farinaceous grain and a proteinaceous meal in a ratio of 10:1 to 1:1 to 25%–30% moisture, subjecting said mixture to primary drying to a moisture content of 3%–10%, then heating said mixture for 20–120 seconds with direct steam at 30–90 p.s.i.g. so as to cause incipient pyrolysis, and terminating said incipient pyrolysis before complete pyrolysis occurs by quenching the product to below the pyrolysis temperature.

2. The method of preparing a hydratable dog meal which comprises conditioning a mixture comprising a farinaceous grain and a proteinaceous meal in a ratio of 10:1 to 1:1 to 25%–30% moisture, subjecting said mixture to primary drying to a moisture content of 5%–7%, then heating said mixture for 30–60 seconds with direct steam at 45–60 p.s.i.g. so as to cause incipient pyrolysis, and terminating said incipient pyrolysis before complete pyrolysis occurs by quenching the product to below the pyrolysis temperature.

References Cited

UNITED STATES PATENTS

| | | | |
|---|---|---|---|
| 1,924,826 | 11/1927 | Anderson | 99—2 |
| 2,075,846 | 4/1937 | Halliday | 99—83 |
| 2,093,260 | 9/1937 | Wilder et al. | 99—83 |
| 2,421,217 | 5/1947 | Penty | 99—83 |
| 2,436,519 | 2/1948 | Luke | 99—83 |
| 2,774,670 | 9/1953 | Albert | 99—2 |
| 3,139,342 | 6/1964 | Linskey | 99—2 |

A. LOUIS MONACELL, *Primary Examiner.*

D. DONOVAN, J. M. HUNTER, *Assistant Examiners.*

UNITED STATES PATENT OFFICE

CERTIFICATE OF CORRECTION

Patent No. 3,365,297                          January 23, 1968

Hovey M. Burgess et al.

It is hereby certified that error appears in the above numbered patent requiring correction and that the said Letters Patent should read as corrected below.

Column 4, line 17, for "including" read -- inducing --.

Signed and sealed this 4th day of March 1969.

(SEAL)
Attest:

Edward M. Fletcher, Jr.                               EDWARD J. BRENNER
Attesting Officer                                         Commissioner of Patents